(12) United States Patent
Annic

(10) Patent No.: US 7,020,496 B2
(45) Date of Patent: Mar. 28, 2006

(54) SYSTEM AND METHOD OF MANAGING ACCESS FROM A MOBILE TERMINAL TO A COMMUNICATION NETWORK

(75) Inventor: Etienne Annic, Rambouillet (FR)

(73) Assignee: Orange France, Montrouge (FR)

( * ) Notice: Subject to any disclaimer, the term of this patent is extended or adjusted under 35 U.S.C. 154(b) by 0 days.

(21) Appl. No.: 10/483,471

(22) PCT Filed: Jul. 4, 2002

(86) PCT No.: PCT/FR02/02336

§ 371 (c)(1),
(2), (4) Date: Jun. 7, 2004

(87) PCT Pub. No.: WO03/009614

PCT Pub. Date: Jan. 30, 2003

(65) Prior Publication Data

US 2004/0209616 A1    Oct. 21, 2004

(30) Foreign Application Priority Data

Jul. 11, 2001    (FR) .................... 01 09249

(51) Int. Cl.
*H04Q 7/20* (2006.01)
*H04M 1/00* (2006.01)
*H04B 1/38* (2006.01)
*G06F 15/16* (2006.01)

(52) U.S. Cl. .................... 455/566; 455/434; 455/450; 455/550.1; 455/557; 455/560; 709/203; 709/219; 709/228

(58) Field of Classification Search ............. 455/414.1, 455/414.2, 414.3, 424–425, 426.2, 433–434, 455/450–451, 452.1, 455, 466, 550.1, 552.1, 455/553.1, 554.2, 555, 556.1, 556.2, 557–561, 455/418–420, 456.3, 456.5, 456.6, 457, 464; 370/395.52, 395.53, 401, 203, 209, 218–219, 370/109–112, 51–52, 348, 734; 709/203, 709/218–219, 228, 209; 725/109–112, 51–52, 725/348, 734
See application file for complete search history.

(56) References Cited

U.S. PATENT DOCUMENTS

| | | | |
|---|---|---|---|
| 5,613,215 A | | 3/1997 | Grube et al. |
| 5,987,513 A | * | 11/1999 | Prithviraj et al. ............ 709/223 |
| 6,085,219 A | * | 7/2000 | Moriya ....................... 709/200 |
| 6,300,947 B1 | * | 10/2001 | Kanevsky ................... 715/866 |
| 6,317,757 B1 | * | 11/2001 | Sakamaki ................... 715/502 |
| 6,832,353 B1 | * | 12/2004 | Itavaara et al. ............. 715/744 |

(Continued)

FOREIGN PATENT DOCUMENTS

WO    WO 00 78080 A    12/2000

(Continued)

*Primary Examiner*—William Trost
*Assistant Examiner*—Meless Zewdu
(74) *Attorney, Agent, or Firm*—Cohen, Pontani, Lieberman & Pavane

(57) ABSTRACT

A technique for managing access from a mobile terminal (10) to a plurality of communications networks (20, 21, 22, 50). The techniqe is noteworthy in that one or more of said communications networks (50), referred to as input network(s), has one or more home pages displayed on said display means of the mobile terminal and containing one or more names identifying said communications networks (20, 21, 22, 50). The technique can be applied to mobile networks providing access from a mobile terminal (10) to a plurality of independent communications networks (20, 21, 22, 50) each offering a set of services.

10 Claims, 1 Drawing Sheet

U.S. PATENT DOCUMENTS

| | | | |
|---|---|---|---|
| 6,865,608 B1 * | 3/2005 | Hunter | 709/229 |
| 2001/0039194 A1 * | 11/2001 | Odamura | 455/550 |
| 2002/0103781 A1 * | 8/2002 | Mori et al. | 707/1 |
| 2002/0143805 A1 * | 10/2002 | Hayes et al. | 707/500 |
| 2002/0197981 A1 * | 12/2002 | Yabe et al. | 455/414 |
| 2003/0159109 A1 * | 8/2003 | Rossmann et al. | 715/513 |
| 2004/0044747 A1 * | 3/2004 | Trevor et al. | 709/217 |
| 2004/0111669 A1 * | 6/2004 | Rossmann et al. | 715/513 |

FOREIGN PATENT DOCUMENTS

| | |
|---|---|
| WO | WO 01/95297 A1 * 12/2001 |

* cited by examiner

SYSTEM AND METHOD OF MANAGING ACCESS FROM A MOBILE TERMINAL TO A COMMUNICATION NETWORK

This is a U.S. national stage of application No. PCT/FR02/02336, filed on Jul. 4, 2002.

FIELD OF THE INVENTION

The present invention relates to a system and to a method for managing access to a communications network from a mobile terminal.

The invention applies more particularly to mobile networks providing access from a mobile terminal to a plurality of independent communications networks each offering a set of services.

BACKGROUND OF THE INVENTION

At present, such services are accessible from a mobile terminal connected to mobile telecommunications networks such as a General Packet Radio Service (GPRS) network or a Universal Mobile Telecommunications System (UMTS) network.

To facilitate understanding the invention, it is described using GPRS and UMTS terminology. However, the invention applies to all communications systems using the same techniques to identify a communications network.

In the above mobile networks, in order to select a communications network offering services, it is necessary to select a name identifying the communications network. To set up a connection between a mobile terminal and a particular communications network, the name is sent via the mobile network to equipment managing access to the communications networks.

In current GPRS and UMTS networks, the name identifying a communications network is called its Access Point Name (APN) and the equipment managing access to the communications networks is called a Gateway GPRS Service Node (GGSN).

An APN mainly comprises a domain name corresponding to the selected communications network, an identifier of the operator managing the communications network, and a GPRS or UMTS mobile network identifier. The APN format is standardized by the European Telecommunications Standards Institute (ETSI).

The functions of a GGSN include recognizing an APN received from a mobile terminal and setting up a connection to the communications network corresponding to that APN. The GGSN is also standardized by the ETSI.

An access protocol is initialized once an APN has been selected on the mobile terminal. In the GPRS and the UMTS, this protocol is the Packet Data Protocol (PDP). A procedure for setting up the connection from the mobile terminal to the GGSN is executed. To enable the connection to be set up, a link is created across the mobile network to the selected communications network. In a GPRS or UMTS network, this link is called a "PDP context". It enables the mobile terminal to access all the services of the communications network, and leads to the display on the mobile terminal of a home page of the communications network showing the services offered.

The ETSI standard provides for a plurality of connections to different communications networks to be set up simultaneously from the same mobile terminal.

At present, a list of APNs corresponding to the communications networks is stored in the user's mobile terminal, for example in the terminal itself, in a SIM or USIM card of the mobile terminal, in a memory card, or in any other data storage device.

U.S. Pat. No. 5,613,213 describes a communications system regularly sending services available to a mobile terminal (which it refers to as a communication unit) from an RF communications system to a memory in the mobile terminal (which it refers to as a service table with a list of services). The list is stored in the mobile terminal so that it can be displayed on its screen.

Memory space must therefore be provided for this list. From the technical point of view, this memory space has a finite and limited size, whereas the number of communications networks available is continually increasing.

The user must regularly enter new APNs and update old APNs, either manually or by downloading a list. This updating process is a source of data entry errors, for example, which interfere with access to the communications networks to which the user subscribes.

Moreover, an APN identifying the communications network, as defined hereinabove, is somewhat inexplicit, as it does not show the services offered by the communications network or the content of the services.

Finally, to access a communications network, the user selects an APN from the list stored in the mobile terminal, in order to set up a connection to the corresponding communications network. To access another communications network, the user must use the mobile terminal to select another APN from the same list.

SUMMARY OF THE INVENTION

One object of the present invention is to provide a system for managing access from a mobile terminal to a plurality of communications networks that remedies the drawbacks of existing systems by eliminating the list of APNs stored in the mobile terminal and facilitating access to the communications networks.

In order to achieve this and other objects, one aspect of the present invention is directed to a system for managing access from a mobile terminal including display means and selection means to a plurality of communications networks, which system is noteworthy in that said mobile terminal includes means for defining one or more of said communications networks as input networks and for defining one or more home pages of said input network(s) displayed on said display means of the mobile terminal and containing one or more names identifying each of said communications networks.

Thus the input communications network is an access point to the other communications networks. It manages access to the communications networks and to the services offered by the input network using a home page containing the APNs identifying the communications networks.

Accordingly, the list of APNs in the input network is updated by the operator that manages the input network, and not by the user of the terminal, in the manner described hereinabove.

The input communications network is sized to accommodate a list of APNs larger than the necessarily limited memory space reserved in the mobile terminal.

In accordance with the invention, each of the names is represented visually by a tag on the home page of the input network.

In accordance with the invention, the tags are defined by an image, an icon, a text object, a sound object, or anything else accessible from a home page.

Each communications network offering a set of services is then represented by a tag that clearly identifies the subject matter and the nature of the services offered, for example stock market services, travel services, games, etc.

According to the invention, a hyperlink on the home page of the input network links each tag to the respective name.

All the communications networks are shown on the input network home page. Each tag represents an APN for a connection to a communications network. The communications networks are selected by selecting the tag on the home page corresponding to the communications network. Navigation from one communications network to another is facilitated by this overview, which allows the selection of a tag, and thus of an APN, after another tag on the same home page.

The invention also provides a method of managing access to a plurality of communications networks from a mobile terminal including display means and selection means, which method is noteworthy in that it comprises the steps of:—storing in the mobile terminal one or more names identifying a communications network referred to as an input network;—creating one or more home pages in the input network;—defining on the home page(s) one or more tags each corresponding to one of the communications networks;—defining a name identifying each of the communications networks;—linking each tag to the respective name identifying the communications networks by a hyperlink on the home page;—choosing the name identifying the input network on the mobile terminal by means of the selection means;—loading the home page of the input network into the display means of the mobile terminal;—selecting on the home page a tag for accessing the communications network corresponding to the tag.

The mobile terminal stores only one or more APNs identifying one or more input communications networks, instead of a list of different APNs identifying different communications networks offering services. The list of APNs, represented by tags, is on the input network home page. When the input network APN is selected, the home page is loaded into the display means of the mobile terminal.

DETAILED DESCRIPTION OF THE DRAWINGS

Figure 1:
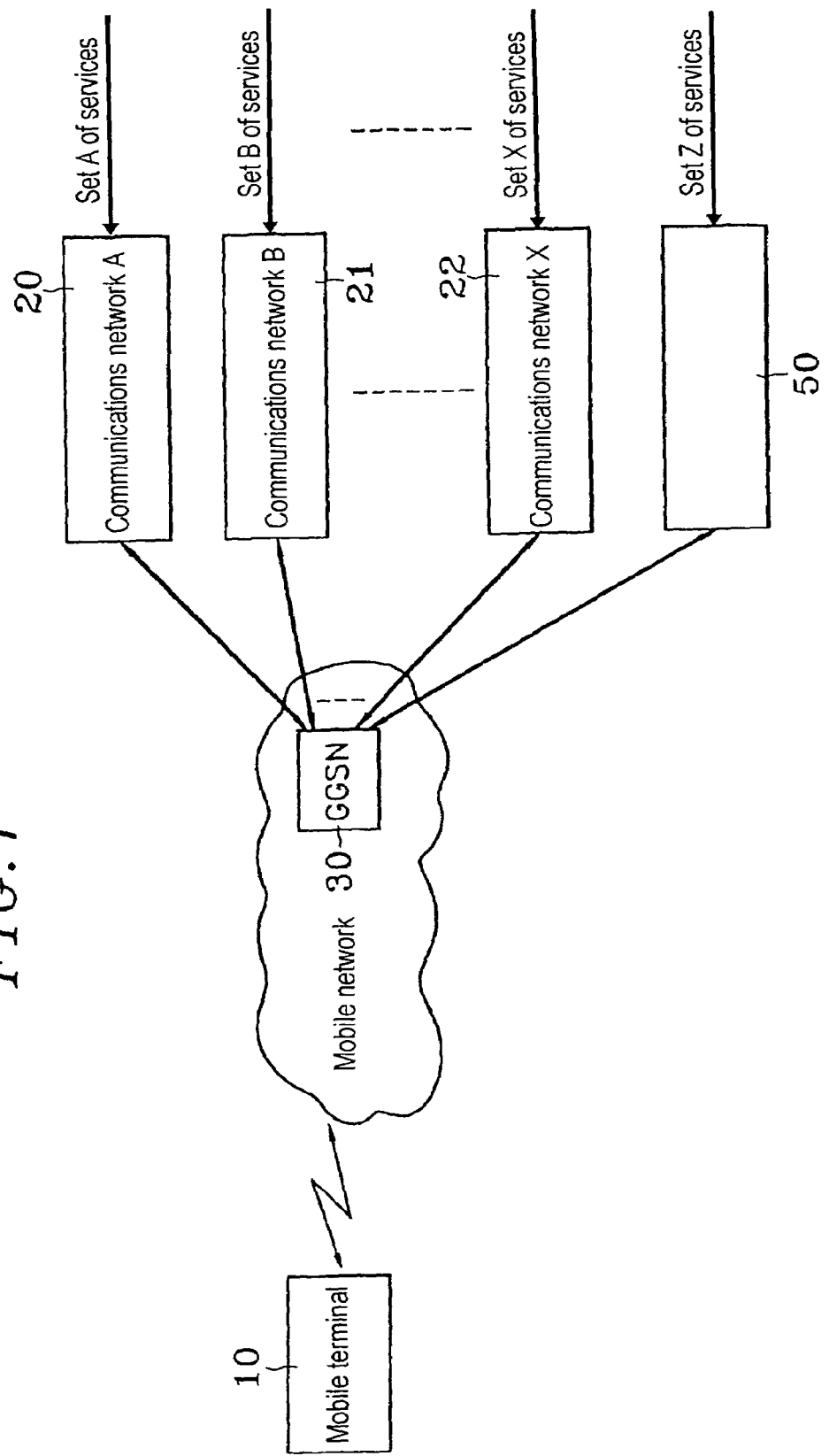
FIG. 1 (the only drawing) is a diagram of the general architecture of a system in accordance with the invention for managing access from a mobile terminal to a plurality of communications networks.

The user subscribes to independent communications networks 20, 21, 22, 50 each offering a set of services and stores in his mobile terminal 10 one or more APNs identifying one or more input communications networks 50.

When the user selects a stored APN, a connection to an input network 50 is set up via the mobile network to the GGSN 30.

Using the display means of the mobile terminal 10, the user defines each of the communications networks 20, 21, 22, 50 to which he has access by means of a tag on one or more home pages of an input network 50. Each tag is chosen by the user to facilitate recognizing the communications networks 20, 21, 22, 50 and the subject matter of the services they offer, and can consist of an image, an icon, a text object, a sound object, or anything else accessible from a home page.

As previously explained, an APN identifies each of the communications networks 20, 21, 22, 50. Each of the tags defined on the home page is linked by a hyperlink to each APN identifying one of the communications networks 20, 21, 22, 50.

A hyperlink is an element in a document that can be selected to initiate an action. In a system according to the invention, an APN, selected by means of a tag, starts an action that in turn initializes a protocol for access to the identified communications network, for example the Packet Data Protocol (PDP). It also executes a procedure for setting up a connection to a GGSN 30, for example a "PDP context" connection, and from the GGSN to a communications network.

The home page stored in the mobile terminal then provides access to the communications networks 20, 21, 22, 50.

In addition to its own particular function, the input network 50 can offer services, like any other communications network. In this case, a tag can represent access to a set of services or a service offered by the input network 50, for example.

The operator that manages the input communications network 50 can also carry out the operations described above if it knows to which communications networks the user subscribes.

What is claimed is:

1. A system for managing access to a plurality of independent communications networks, each of the plurality of independent communications networks offering a set of services, such system comprising:

a mobile terminal including display means and selection means; and at least one input network having a home page containing names respectively identifying the plurality of independent communications networks, wherein said names identifying the plurality of independent communications networks are displayed on said display means of said mobile terminal when said mobile terminal accesses said home page of said input network;

said selection means including means for selecting one of said names contained on said home page, and means for setting up a connection to whichever one of the plurality of independent communications networks is associated with the selected one of the names, such that the input network enables access to the plurality of independent communications networks.

2. The system according to claim 1, wherein each of said names identifying the plurality of communications networks is represented visually by a tag on said home page of said input network.

3. The system according to claim 2, wherein said tags are defined by an image, an icon, a text object, a sound object, or another object accessible from a home page.

4. The An access management according to claim 3, further comprising a plurality of hyperlinks, wherein each hyperlink on said home page of said input network links each tag to a communications network corresponding to the respective name.

5. A method of managing access to a plurality of independent communications networks from a mobile terminal including display means and selection means, each of the plurality of independent communications networks offering a set of services, said method comprising the steps of:

storing in the mobile terminal one or more names identifying an input network;

creating a home page in the input network;

defining on the home page one or more tags each corresponding to one of the plurality of communications networks;
defining, on the home page, a name identifying each of the plurality of independent communications networks;
linking each tag to the respective name identifying a communications network by a hyperlink on the home page;
choosing the name identifying the input network on the mobile terminal using the selection means;
loading the home page of the input network into the display means of the mobile terminal;
selecting, from the home page displayed on the mobile terminal, a tag for accessing the one of the plurality of independent communications networks corresponding to the tag; and
setting up a connection between the mobile terminal and whichever one of the plurality of independent communications networks corresponds to the tag.

6. The system according to claim 2, further comprising a plurality of hyperlinks, wherein each hyperlink on said home page of said input network links each tag to a communication network corresponding to the respective name.

7. The system according to claim 1, wherein said input network is one of the plurality of independent communication networks.

8. The system according to claim 1, wherein said mobile terminal stores only access point names ("APNs") associated with said input network.

9. The method according to claim 5, wherein the tags and names on the home page are managed by an operator of the input network.

10. The method according to claim 5, wherein said step of storing names on the mobile terminal includes storing only names identifying an input network.

* * * * *